United States Patent
Wing (10) Patent No.: US 7,308,101 B2
(45) Date of Patent: Dec. 11, 2007

(54) METHOD AND APPARATUS FOR TRANSPORTING ENCRYPTED MEDIA STREAMS OVER A WIDE AREA NETWORK

(75) Inventor: Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 10/763,471

(22) Filed: Jan. 22, 2004

(65) Prior Publication Data

US 2005/0163316 A1 Jul. 28, 2005

(51) Int. Cl.
*H04K 1/00* (2006.01)
*H04L 12/66* (2006.01)

(52) U.S. Cl. .................. 380/257; 370/352; 370/355; 370/356

(58) Field of Classification Search ................ 380/257; 370/355, 352
See application file for complete search history.

(56) References Cited

U.S. PATENT DOCUMENTS

| | | | | |
|---|---|---|---|---|
| 5,392,357 | A * | 2/1995 | Bulfer et al. ................... | 380/33 |
| 5,991,292 | A * | 11/1999 | Focsaneanu et al. .......... | 370/352 |
| 6,137,869 | A * | 10/2000 | Voit et al. ................ | 379/114.01 |
| 6,381,238 | B1 * | 4/2002 | Hluchyj ........................ | 370/352 |
| 6,426,948 | B1 * | 7/2002 | Bowman-Amuah .......... | 370/260 |
| 7,110,391 | B1 * | 9/2006 | Rogers et al. ................ | 370/352 |
| 2001/0038628 | A1 * | 11/2001 | Ofek et al. .................... | 370/392 |
| 2002/0196781 | A1 * | 12/2002 | Salovuori ..................... | 370/352 |
| 2003/0021415 | A1 * | 1/2003 | Torvinen ...................... | 380/255 |
| 2003/0056092 | A1 * | 3/2003 | Edgett et al. ................. | 713/153 |
| 2003/0131353 | A1 | 7/2003 | Blorn et al. | |
| 2004/0019801 | A1 * | 1/2004 | Lindholm et al. ............ | 713/200 |
| 2004/0022237 | A1 * | 2/2004 | Elliott et al. ................. | 370/356 |
| 2004/0068481 | A1 * | 4/2004 | Seshadri et al. ................ | 707/1 |
| 2004/0205359 | A1 * | 10/2004 | Matsuhira ..................... | 713/201 |
| 2005/0125357 | A1 * | 6/2005 | Saadat et al. ................... | 705/57 |

OTHER PUBLICATIONS

Schneier, Bruce. Applied Cryptography. 2nd Edition. John Wiley & Sons Inc. 1996. pp. 47-51.*

* cited by examiner

*Primary Examiner*—Kambiz Zand
*Assistant Examiner*—Jason K. Gee
(74) *Attorney, Agent, or Firm*—Stolowitz Ford Cowger LLP (57) ABSTRACT

A network processing device identifies call requests that require secure media connections and that also require transport over both a packet switched network and a circuit switched network. The network processing device establishes an IP link over the circuit switched network and directs endpoints for the media connection to use Internet Protocol (IP) media encryption. The same IP encrypted media is then transported end-to-end over both the packet switched network and the IP link in the circuit switched network.

21 Claims, 4 Drawing Sheets

METHOD AND APPARATUS FOR TRANSPORTING ENCRYPTED MEDIA STREAMS OVER A WIDE AREA NETWORK

BACKGROUND

Many mechanisms exist to encrypt voice over a Public Switched Telephone Network (PSTN). For example, customers can deploy devices in front of Private Branch Exchanges (PBXs) that encrypt calls made over the PSTN. These devices detect the presence of a similar encryption device on a far end of the call and then establish an encrypted call with the far end device. These encryption mechanisms are used for example by the military and defense contractors.

Secure Real-time Transport Protocol (SRTP) is a standard used for encrypting real-time media, such as voice or video, in an Internet Protocol (IP) network. The SRTP encryption scheme is used to protect voice or video sent over the IP network. Other legacy encryption equipment is then used to protect the same voice or video stream when transported over the PSTN.

For example, a Voice Over IP (VoIP) call is encrypted into SRTP packets and then transported over an IP network. If the VoIP call needs to travel over a PSTN network, the media in SRTP packets is decrypted and decoded. The decrypted and decoded media is then re-encrypted by a PSTN encryption device prior to being transported over the PSTN. On the opposite end of the PSTN connection, the PSTN encrypted media is decrypted and decoded. The decrypted media is then re-encoded and re-encrypted back into SRTP packets for transport over the IP network to a final destination endpoint.

This multi-stage encryption process breaks end-to-end encryption and requires additional jitter buffers and codecs that add significant delay and adversely affect voice quality.

SUMMARY OF THE INVENTION

A network processing device identifies call requests that require secure media connections and that also require transport over both a packet switched network and a circuit switched network. The network processing device establishes an IP link over the circuit switched network and directs endpoints for the media connection to use Internet Protocol (IP) media encryption. The same IP encrypted media is then transported end-to-end over both the packet switched network and the IP link in the circuit switched network.

The foregoing and other objects, features and advantages of the invention will become more readily apparent from the following detailed description of a preferred embodiment of the invention which proceeds with reference to the accompanying drawings.

DETAILED DESCRIPTION

Figure 1:
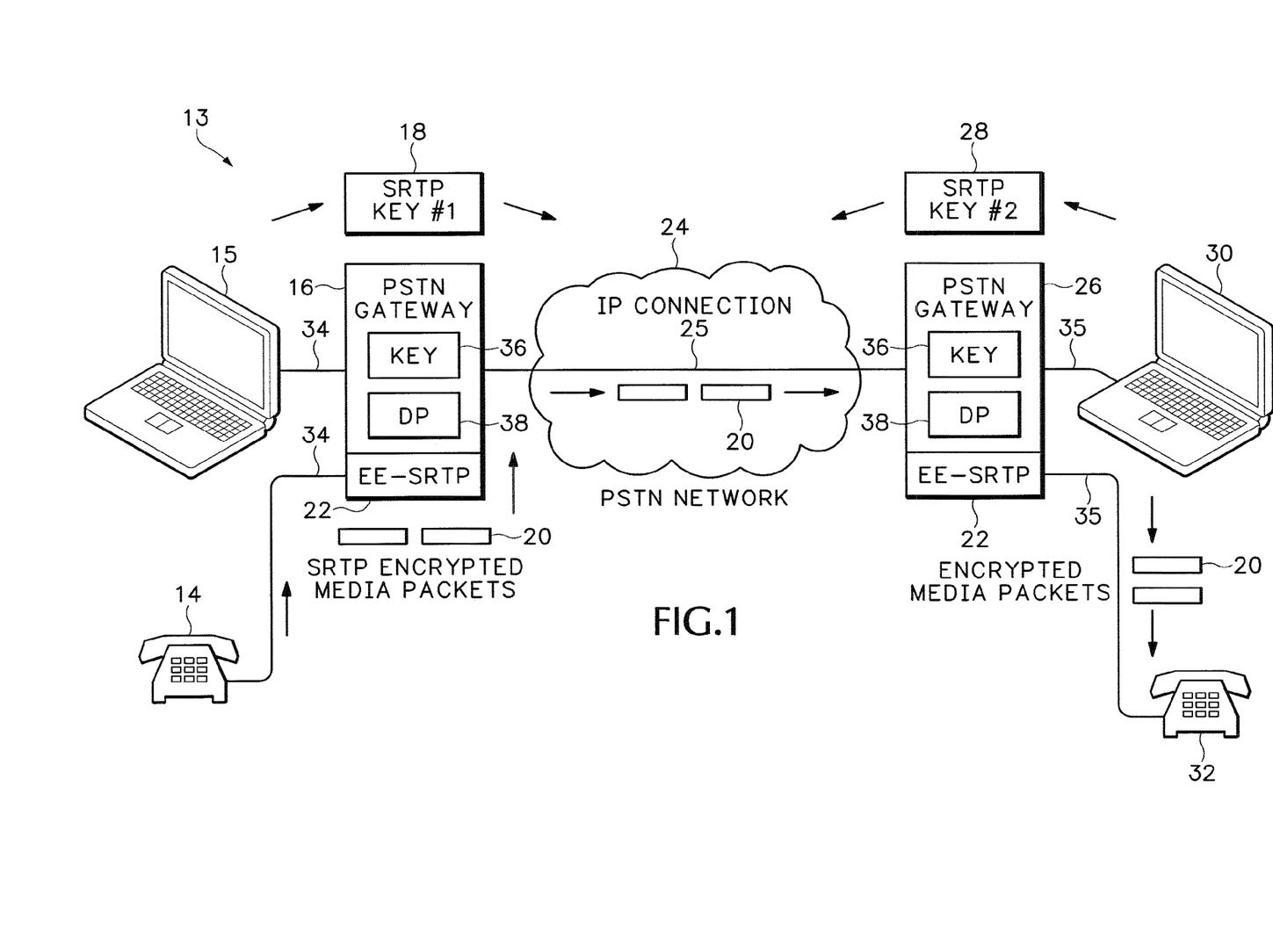
FIG. 1 is a diagram of a Wide Area Network (WAN) that uses an End-to-End Secure Real-Time Transport Protocol (EE-SRTP).

Referring to FIG. 1, a Wide Area Network (WAN) 13 includes an IP network 34, 35 and a Public Switched Telephone Network (PSTN) 24. An End-to-End Secure Real-time Transport Protocol (EE-SRTP) 22 is used to transport SRTP packets 20 over both the IP networks 34 and 35 and over the PSTN network 24. Media is encrypted at a call endpoint and then transported to a destination endpoint without having to decrypt and then re-encrypt the media when it reaches the edge of the PSTN network 24. The terms PSTN and circuit switched network are used interchangeably in the description below. The PSTN and circuit switched networks are distinguished from packet switched networks that use an Internet Protocol (IP) for transferring data over a network.

The WAN 13 includes a phone 14 and a computer 15 that are connected to a PSTN gateway 16 through IP network 34. The PSTN gateway 16 is connected through a PSTN network 24 to another PSTN gateway 26. A phone 32 and computer 30 are connected to PSTN gateway 26 through another IP network 35.

The computers 15 and 30 can be any laptop, Personal Computer (PC), server, etc. capable of sending or receiving a media stream. The media stream can include any real time media such as audio data, video data, and real time text such as the text used for the hearing impaired. The phones 14 and 32 shown in FIG. 1 are Voice Over Internet Protocol (VoIP) phones that convert voice signals into IP packets and correspondingly convert voice data contained in received IP packets into voice signals.

The PSTN gateways 16 and 26 are used to convert media between the IP format used in the IP networks 34, 35 and the analog or digital formats used in the PSTN network 24. The gateways 16 and 28 can also manage the signaling required for establishing the media calls over IP networks 34, 35, and the PSTN network 24. The EE-SRTP 22 is configured into gateways 16 and 22 and enables both gateways to transport SRTP encrypted packets 20 over the PSTN network 24 without having to decrypt and re-encrypt media at intermediary hops in the call.

Figure 2:
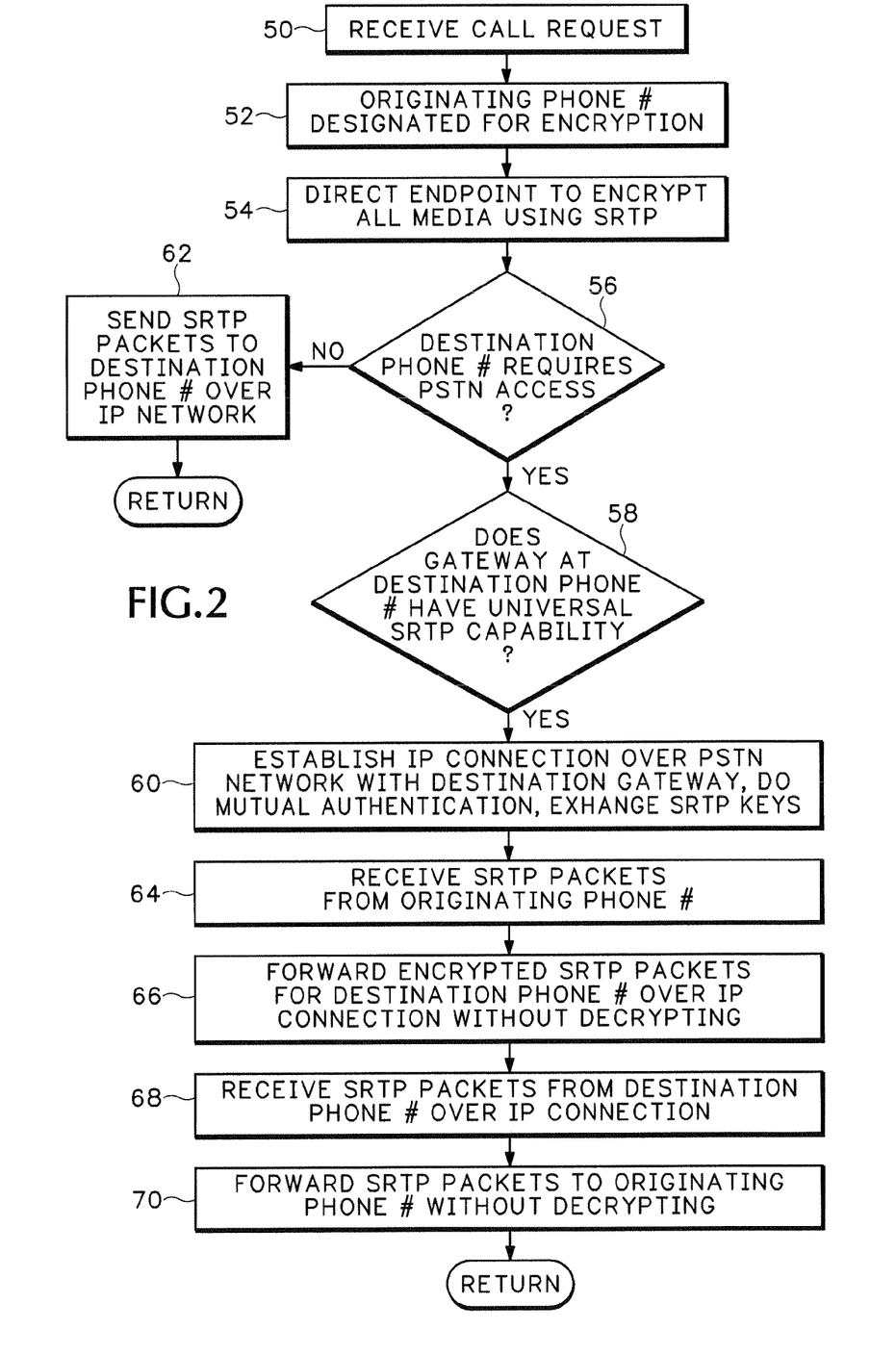
FIG. 2 is a block diagram showing how EE-SRTP operates in a gateway.

Referring to FIGS. 1 and 2, any combination of the phones 14 and 32, computers 15 and 30, and gateways 16 and 26 are referred to generally below as endpoints, users, senders or receivers, etc. One of the endpoints initiates a media call to another endpoint. For example, the phone 14 may make a VoIP phone call to phone 32. A caller dials the phone number for phone 32 using phone 14. The gateway 16 then determines the IP address for the gateway 26 serving phone 32. The two gateways 16 and 30 then conduct a signaling session that establishes a connection between phone 14 and phone 32.

In another example, the computer 15 may request a video stream and/or audio stream from computer 30 which operates as a music and video content server. In another scenario, the computer 15 may wish to make a VoIP call to VoIP phone 32 or to computer 30. The computer 15 may establish the connection through gateway 16 or may access the gateway 26 or computer 30 directly through the PSTN network 24, without using gateway 16.

In the example described below, the phone 14 initiates a VoIP phone call to phone 32. Because phone 14 is initiating the call to phone 32, the PSTN gateway 16 will be alternatively referred to as the egress gateway 16. The PSTN gateway 26 associated with the target phone 32 is referred to as the ingress gateway 26.

The two PSTN gateways 16 and 28 are preconfigured, out of band, with a shared secret (key 36) and are also configured with a dial plan 38 of their peers. The dial plan 38, among other things, associates phone numbers with IP addresses. The dial plan 38 can also identify certain destination phone numbers that require a connection through the PSTN network 24. The dial plan 38 can also identify gateways, such as gateway 26, that are configured with the EE-SRTP 22.

A user (not shown) enters the phone number of phone 32 into phone 14. The call request is received by egress gateway 16 in block 50 (FIG. 2). The egress gateway 16 determines from the originating phone number of phone 14 that the call should use SRTP. For example, the phone 14 may be associated with a military contractor or some other high security communication. In block 54, the egress gateway 16 tells the phone 14 to use only SRTP for the call. Accordingly, the phone 14 encrypts the media and other information contained in Real-time Transport Protocol (RTP) and Real-time Control Protocol (RTCP) packets using SRTP or some other type of encryption scheme.

In block 56, the egress gateway 16 determines whether or not a connection to the destination phone number for phone 32 requires access over the PSTN network 24. If not, the SRTP packets 20 are forwarded in a conventional manner over the IP network 34 in block 62. The egress gateway 16 determines in block 58 whether or not the ingress gateway 26 supporting phone 32 is configured with EE-SRTP 22. This information may be located in dial plan 38 in general memory or may be located at a call center (not shown) that is accessed by egress gateway 16.

If the ingress gateway 26 is configured with EE-SRTP 22 in block 58, an IP connection is established over the PSTN 24 in block 60. The gateways 16 and 26 authenticate each other as described in further detail below in FIG. 3 and then exchange SRTP encryption keys 18 and 28. The phone 14 sends the SRTP key 18 to the egress gateway 16 which then forwards the SRTP key 18 over the IP link 25 to phone 32. The phone 32 sends a second SRTP key 28 to the gateway 26 which then forwards the second SRTP key 28 over the IP link 25 to phone 14.

Phone 14 then encrypts voice data into SRTP packets using SRTP key 18 and phone 32 to encrypt voice data using SRTP keys 28. The encrypted SRTP packets 20 from phone 14 are received by the egress gateway 16 in block 64 and forwarded in the same encrypted SRTP format over the IP link 25 in PSTN 24. The ingress gateway 26 forwards the SRTP packets to the phone 32. Phone 32 then decrypts the packets 20 using SRTP key 18.

A similar process is used for SRTP packets sent by phone 32 to phone 14. The gateway 26 forwards the SRTP packets 20 from phone 32 over the IP connection 25 to gateway 16. Gateway 26 does not decrypt the SRTP packets 20. The gateway 16 receives the SRTP packets 20 from gateway 26 in block 68 and forwards the encrypted SRTP packets to phone 14 in block 70.

If the ingress gateway 26 is not configured with EE-SRTP in block 58, the egress gateway 16 processes SRTP packets for the call in a conventional manner in blocks 72-84. The SRTP packets are received from phone 14 in block 72 and the SRTP packets are decrypted in block 74. The decrypted media is converted into a PSTN format in block 76. For example, an RTP payload in the SRTP packets may be converted into a Time Division Multiplexed (TDM) format for transmitting over the PSTN network 24. The media may then be re-encrypted using a conventional PSTN encryption device in block 77 and forwarded over the PSTN network 24 to the ingress gateway 26 in block 78. The ingress gateway 26 has to then decrypt and decode the PSTN call and then re-encode and re-encrypt the call into SRTP packets. The ingress gateway 26 then forwards the SRTP packets to phone 32.

Similarly in the opposite direction, the gateway 16 in block 80 receives PSTN encrypted data over the PSTN 24 from gateway 26. The gateway 16 decrypts and decodes the PSTN media in block 82 then re-encodes and re-encrypts the media into SRTP packets. The SRTP packets are then forwarded to the phone 14 in block 84.

Figure 3:
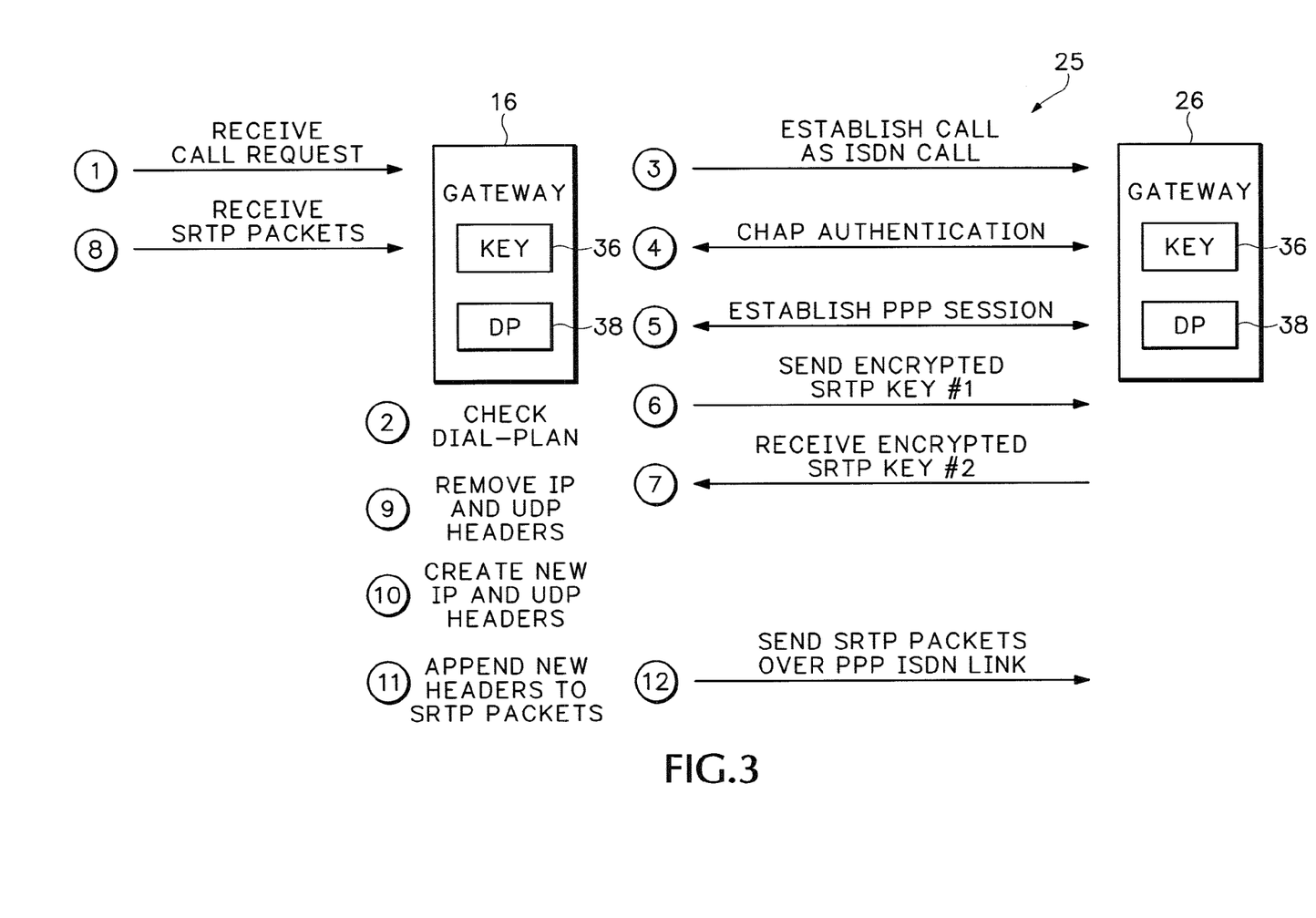
FIG. 3 is a diagram showing how SRTP packets are transported over an IP link in a PSTN network.

FIG. 3 shows in more detail how the IP connection 25 is established between the two gateways 16 and 26. It is still assumed that the call is initiated by phone 14 to phone 32 (FIG. 1). In operation 1, the egress PSTN gateway 16 receives a call request from phone 14. In operation 2, the egress PSTN gateway 16 examines the dial plan 38 to determine if the call requires SRTP 22. One particular technique for using the dial plan 38 is described in U.S. Pat. No. 6,584,093 which is herein incorporated by reference.

For example, the dial plan in egress gateway 16 associates SRTP with the originating phone number for phone 14. Whenever the phone 14 initiates a call, egress gateway 16 compares the source phone number in the call request with the SRTP entries in the dial plan 38. If a match exists, then egress gateway 16 directs the phone 14 to encrypt all media using SRTP. The dial plan 38 may also or alternatively link certain destination phone numbers with SRTP encryption. When the destination phone number in the call request matches an SRTP number in the dial plan 38, the egress gateway 16 directs the phone 14 to encrypt all media packets using SRTP.

The egress gateway 16 conducts normal signaling over the PSTN 24 for the call to phone 32, except the call is established as an ISDN call (Clear Channel Data) in operation 3. This means no Digital Signal Processors (DSPs) are consumed on the egress gateway 16 or ingress gateway 26. This also means no modem protocols are used between the egress gateway 16 and ingress gateway 26.

After signaling the PSTN 24 and establishing connectivity with the ingress gateway 26, the egress gateway 16 and the ingress gateway 26 perform mutual authentication using Challenge Handshake Authentication Protocol (CHAP) in operation 4. The shared secret 36, previously configured into the two gateways 16 and 28, is used for this authentication. After mutual authentication, a Point-to-Point (PPP) session is established over the PSTN 24 in operation 5. This PPP session runs IP unnumbered interfaces, but does_NOT_IP route packets from the two IP networks. Rather, the IP and UDP headers are only provided to allow running over an unmodified implementation of the stack.

After the PPP session is established, in operation 6 the egress gateway 16 takes the SRTP key 18 which it receives from the phone 14, encrypts the SRTP key 18 using the shared secret 36, and sends the encrypted SRTP key 18 to the ingress gateway 26. The ingress gateway 26 does a similar operation 7 by encrypting the SRTP key 28 from phone 32 and sending the encrypted key to the egress gateway 16. This exchange is done using a new, proprietary PPP protocol-id.

Now both gateways 16 and 28 know the two SRTP keys 18 and 26 and can perform call setup with their respective VoIP networks. Gateway 16 decrypts the encrypted key 28 and sends the decrypted key SRTP key 28 to phone 14. Gateway 26 decrypts SRTP key 18 and sends the decrypted key to phone 32.

The gateway 16 receives SRTP packets from phone 14 in operation 8. The gateway 16 removes the IP header and UDP header from the received SRTP packets in operation 9 and creates a new IP and UDP header in operation 10. The gateway 16 appends the new IP and UDP headers to the SRTP packet in operation 11 and sends the SRTP packet over the PPP ISDN link in operation 12. The RTP header in the SRTP packet is preserved because SRTP authentication is done over the entire RTP header. Transmission of these SRTP packets is done using a new, proprietary PPP protocol-id.

Thus, the EE-SRTP sends SRTP-protected VoIP traffic over the PSTN by securely exchanging the SRTP keys and sending SRTP over PPP. This provides full end-to-end encryption of the media stream, without decrypting the stream in intermediate devices. The full end-to-end encryption is achieved without additional latency due to the encryption as would typically be the case if the SRTP packets had to be decrypted in order to encode into a Pulse Code Modulation (PCM) format and then re-encrypted using legacy encryption equipment.

Figure 4:
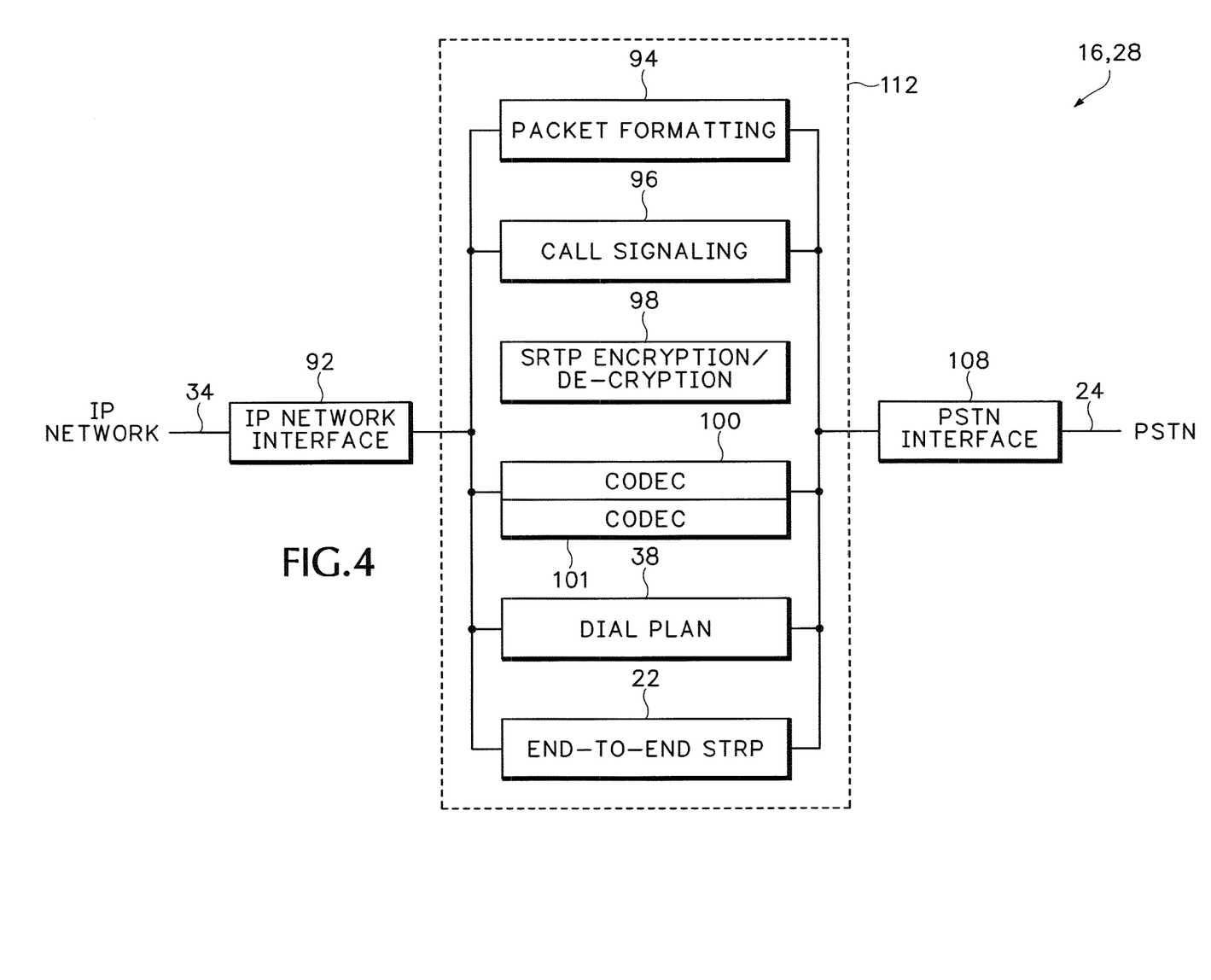
FIG. 4 is a more detailed diagram of a gateway that supports EE-SRTP.

FIG. 4 shows in more detail the circuitry used for supporting EE-SRTP. The circuitry in one example is located in a network PSTN gateway but could alternatively be located in any network processing device used for transmitting IP media packets over different network infrastructures.

An IP network interface 92 connects to an IP network 90 and a PSTN interface 108 connects to a PSTN network 110. One or more processors 112 include different software programs for performing the different operations used by the EE-SRTP 22. Packet formatting software 94 is used to replace the IP and UDP headers for the media packets. Call signaling software 96 is used for conducting the RTP and RTCP protocol with the IP endpoints and for conducting the signaling for establishing the IP link over the PSTN network. The SRTP encryption/decryption software 98 encrypts IP media packets when a destination gateway is not configured with EE-SRTP 22.

The PSTN encryption and decryption software 102 is used for encrypting and decrypting the media when the encrypted SRPT packets cannot be transported "as is" over the PSTN 24. The dial plan 38 contains source and destination phone numbers and information associated with these phone numbers. For example, source phone numbers that are suppose to use SRTP may have a SRTP flag. If a destination phone number requires transport over a PSTN network, a PSTN flag may be associated with that destination phone number. IP addresses are also associated with different phone numbers in the dial plan 38.

Different Coder/Decoders (codecs) 100 can be used according to the scheme used for transporting the IP media over the PSTN network. For example, the IP link 25 established over the PSTN 24 may have a bandwidth of 64 thousand bits per second (kbps). Some amount of that bandwidth will be used for transporting SRTP packets headers. However, the headers may not be transported when the SRTP packets are converted into a conventional PSTN call. Thus, a first codec 100 with increased data compression might be used when encrypted SRTP packets are sent over IP link 25. A second codec 101 with less data compression may be used for conventional PSTN transport over the PSTN network.

A simplified RTP header compression technique, based on RFC2508, can be utilized to allow larger payloads to still fit within 64 kbps. In addition, Multilink PPP (MLPPP) can be used to bind multiple DS0s channels together for one VoIP call, and would allow for higher bandwidth voice or video applications.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method comprising:

receiving a call request over a packet switched network at a first gateway that is located between the packet switched network and a circuit switched network;

comparing a phone number included in the call request with entries in a local dial plan located at the first gateway;

sending one or more signals from the first gateway to a source endpoint when the phone number included in the request matches one of the entries in the local dial plan, the signals directing the source endpoint to encrypt media packets for the requested call using a protocol for encrypting real-time media;

receiving the encrypted media packets from the source endpoint responsive to sending the signals;

when a transfer path for the requested call includes a leg traversing the circuit switched network, determining whether a remote second gateway that is located on the transfer path and between the circuit switched network and the same or another packet switched network is configured for end-to-end secure transport;

establishing an Internet Protocol (IP) link that traverses the circuit switched network when the second gateway is configured for end-to-end secure transport, the IP link extending from the first gateway to the second gateway;

reformatting the encrypted media packets for transport over the IP link when the second gateway is configured for end-to-end secure transport, said reformatting occurring without decrypting an encrypted payload attached to the encrypted media packets; and transferring the reformatted encrypted media packets over the established IP link.

2. A method according to claim 1 further including:

decrypting the payload locally at the first gateway when the remote second gateway is not configured for end-to-end secure transport;

formatting media included in the encrypted media packets into a Public Switched Telephone Network (PSTN) format when the remote second gateway is not configured for end-to-end secure transport; and transferring the formatted media over the circuit switched network for re-encryption at the remote second gateway.

3. The method according to claim 1 including establishing a data channel over the circuit switched network and using a Point to Point Protocol over the data channel to establish the IP link.

4. A method according to claim 3 including establishing the data channel over an Integrated Services Digital Network (ISDN) channel of the circuit switched network.

5. A method according to claim 1 including:
authenticating the second gateway;
sending a first encrypted key associated with the source endpoint over the circuit switched network to the authenticated second gateway;
receiving a second encrypted key over the circuit switched network from the authenticated second gateway;
decrypting the second key and forwarding the decrypted second key over the packet switched network to the source endpoint;
encrypting the payload at the source endpoint using the first key according to the signals; and
decrypting the payload at the source endpoint using the second key.

6. A method according to claim 1 including encrypting the payload only once, said encryption occurring at the source endpoint, and decrypting the payload only once, said decryption occurring at a destination endpoint.

7. A method according to claim 1 including:
encrypting the payload using a Secure Real-time Transport Protocol (SRTP);
establishing a Point to Point Protocol (PPP) connection over an Integrated Services Digital Network (ISDN) channel in the circuit switched network; and
sending the SRTP encrypted payload over the PPP connection.

8. A network processing device, comprising: a processor configured to establish an Internet Protocol (IP) link for transferring received encrypted IP packets over a circuit switched network, the IP link extending across the circuit switched network and between the network processing device and a remote gateway that is located between a packet switched network and the same or another circuit switched network; the processor configured to identify one or more IP headers included in the received IP packets, to remove the IP headers while preserving encryption on one or more Secure Real-time Transport Protocol (SRTP) headers and a corresponding payload, to locally generate on or more new IP headers, to attach the generated IP headers to the encrypted SRTP headers and the encrypted corresponding payload, to forward the IP packets having the locally generated IP headers, the encrypted STRP headers and the encrypted corresponding payload over the IP link; wherein the IP packets are forwarded over the IP link without decrypting the payload.

9. A network processing device according to claim 8 wherein the processor compresses the forwarded IP packets using a first data compression codec having greater data compression capability than a second data compression codec used by the processor for other traffic that is decrypted before forwarding over a data link in the circuit switched network.

10. A network processing device according to claim 8 including a memory containing a dial plan for identifying phone numbers that can be transferred between the packet switched network and the circuit switched network without decrypting the received IP packets.

11. A network processing device according to claim 8 including memory for storing a shared key shared with the remote gateway, the processor receiving a first key from a first endpoint, encrypting the first key using the shared key and sending the encrypted first key to the remote gateway.

12. A network processing device according to claim 11 wherein the processor receives a second encrypted key from the remote gateway, the processor decrypting the second encrypted key using the shared key and then forwarding the second decrypted key to the first endpoint.

13. A network processing device according to claim 8 wherein the processor conducts a Point to Point Protocol over an Integrated Services Digital Network (ISDN) channel for establishing the IP link over the circuit switched network.

14. A method comprising: receiving encrypted packets from a packet switched network; establishing an Internet Protocol (IP) link for transferring received encrypted packets over a circuit switched network; identifying one or more addressing headers included in the received encrypted packets; removing the addressing headers while preserving encryption on one or more Secure Real-time Transport Protocol (SRTP) headers and a corresponding payload; attaching new addressing headers to the encrypted SRTP headers and the encrypted corresponding payload; forwarding the packets having the new addressing headers, the encrypted SRTP headers and the encrypted corresponding payload over the IP link; and wherein the packets are forwarded over the IP link without decrypting the payload.

15. The method of claim 14 further comprising:
comparing a phone number included in a call request with a dial plan, the call request being associated with the packets and received before the packets; and
sending a signal that is configured to cause an originating endpoint to perform encryption using SRTP when the phone number corresponds with the dial plan.

16. The method of claim 14 wherein the packets include voice data such that the voice data is securely transported across both the circuit switched network and the packet switched network without intermediary decryption.

17. The network processing device according to claim 8 where the processor is further configured to:
receive a pre-configuring out-of-band communication that provides a secret that is shared with the remote gateway;
receive a first key sent from a calling endpoint and usable for decrypting the IP packets;
encrypt the first key using the secret;
send the encrypted first key to the remote gateway;
receive a second key that corresponds to a value stored on a called endpoint and that is encrypted by the remote gateway using the secret;
decrypt the received encrypted second key using the secret; and
send the decrypted second key to the calling endpoint.

18. A system, comprising: means for receiving encrypted packets from a packet switched network; means for establishing an Internet Protocol (IP) link for transferring received encrypted packets over a circuit switched network; means for identifying one or more addressing headers included in the received encrypted packets; means for removing the addressing headers while preserving encryption on one or more secure real time protocol headers and a corresponding payload; means for attaching new addressing headers to the encrypted secure real time protocol headers and the encrypted corresponding payload; and means for forwarding the packets having the new addressing headers, the encrypted secure real time protocol headers and the encrypted corresponding payload over the IP link; wherein the packets are forwarded over the IP link without decrypting the payload.

19. The system of claim 18 wherein the packets represent video to be played out at the destination endpoint.

20. The system of claim 18 wherein the new addressing headers are attached at a first gateway located between a circuit switched network and a packet switched network and the packets are forwarded to a second gateway located between the same or another circuit switched network and the same or another packet switched network.

21. The system of claim 20 wherein the first gateway is configured to determine whether the second gateway supports an End-to-End Secure Real-time Transport Protocol (EE-SRTP) protocol by accessing a dial plan stored locally on the first gateway.

* * * * *

UNITED STATES PATENT AND TRADEMARK OFFICE
CERTIFICATE OF CORRECTION

PATENT NO. : 7,308,101 B2
APPLICATION NO. : 10/763471
DATED : December 11, 2007
INVENTOR(S) : Wing

Page 1 of 1

It is certified that error appears in the above-identified patent and that said Letters Patent is hereby corrected as shown below:

At column 7, line 46, please replace "locally generate on or more" with --locally generate one or more--.
At column 7, line 50, please replace "encrypted STRP headers" with --encrypted SRTP headers--.
At column 8, line 26, please replace "IP link; and" with --IP link, and--.

Signed and Sealed this

Twenty-fourth Day of March, 2009

JOHN DOLL
*Acting Director of the United States Patent and Trademark Office*